US011562038B2

(12) United States Patent
Ecker et al.

(10) Patent No.: US 11,562,038 B2
(45) Date of Patent: Jan. 24, 2023

(54) SYSTEM AND METHOD OF INTEGRATING DATA

(71) Applicant: The Toronto-Dominion Bank, Toronto (CA)

(72) Inventors: Jeffrey Aaron Ecker, Toronto (CA); Bryan Michael Gleeson, Bowmanville (CA); Adam Douglas McPhee, Waterloo (CA); Matta Wakim, Petersburg (CA); Kyryll Odobetskiy, Waterloo (CA); Arun Victor Jagga, Toronto (CA); John Jong-Suk Lee, Toronto (CA); Rakesh Thomas Jethwa, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 190 days.

(21) Appl. No.: 17/155,905

(22) Filed: Jan. 22, 2021

(65) Prior Publication Data

US 2021/0141844 A1    May 13, 2021

Related U.S. Application Data

(63) Continuation of application No. 15/725,644, filed on Oct. 5, 2017.

(51) Int. Cl.
*G06F 16/25* (2019.01)
*G06F 16/953* (2019.01)
*G06F 16/11* (2019.01)

(52) U.S. Cl.
CPC .......... *G06F 16/953* (2019.01); *G06F 16/119* (2019.01); *G06F 16/25* (2019.01)

(58) Field of Classification Search
None
See application file for complete search history.

(56) References Cited

U.S. PATENT DOCUMENTS

| | | | |
|---|---|---|---|
| 9,235,854 B1 | 1/2016 | O'Donnell et al. | |
| 9,292,854 B2 | 3/2016 | Junger et al. | |
| 9,978,078 B2 | 5/2018 | Dapremont et al. | |
| 10,032,142 B2 | 7/2018 | Argue et al. | |
| 2012/0084181 A1* | 4/2012 | Miura | G06Q 30/00 705/27.1 |
| 2014/0172726 A1* | 6/2014 | Junger | G06Q 10/00 705/304 |
| 2015/0254700 A1 | 9/2015 | Jain | |
| 2016/0019626 A1 | 1/2016 | Pham | |
| 2016/0203485 A1* | 7/2016 | Subramanian | G06Q 30/00 705/44 |

* cited by examiner

*Primary Examiner* — Cai Y Chen
(74) *Attorney, Agent, or Firm* — Graham Patent Law

(57) ABSTRACT

A data set integration system receives a first data set that includes a user identifier and a message type code. The integration system locates an object profile that is associated with the terminal identifier in a data repository. The located object profile includes a tracking identifier and a counter value. The integration system updates the counter value in the object profile in accordance with a value of the message type code. The integration system updates receives a second data set from a communications device. The second data set includes the tracking identifier. The integration system locates the counter value in the object profile that is associated with the tracking identifier, and transmits to the communications device a data payload that includes the updated counter value.

21 Claims, 5 Drawing Sheets

SYSTEM AND METHOD OF INTEGRATING DATA

RELATED APPLICATIONS

This patent application is a continuation application of U.S. patent application Ser. No. 15/725,644, filed Oct. 5, 2017, entitled "System and Method of Integrating Data", the contents of which are incorporated herein by reference.

FIELD

This patent application relates to a system and method of integrating data into a database.

BACKGROUND

In a relational database framework, new databases may be incorporated into the relational database by linking data fields in the new databases to data fields in the relational database. This approach provides the framework with a measure of design flexibility. However, the size of the relational database increases as new databases are added.

SUMMARY

This patent application discloses a system and associated method that integrates data sets into a data repository.

In accordance with a first aspect of this disclosure, there is provided a data integration system that includes at least one memory and at least one processor. The processor is in communication with the memory, and is configured to receive, over a communications network, a first data set that includes a user identifier and a message type code.

The processor is configured to select a terminal profile from a profile database. The selected terminal profile is associated with the user identifier and includes a tracking identifier. The processor is also configured to locate the tracking identifier in the selected terminal profile.

The processor receives a first data set that includes a terminal identifier and a message type code. The processor is configured to locate an object profile that is associated with the terminal identifier in a data repository. The located object profile includes a tracking identifier and a counter value. The processor is also configured to update the counter value in the object profile in accordance with a value of the message type code.

The processor also receives a second data set from a communications device. The second data set includes the tracking identifier. The processor is configured to locate the counter value in the object profile that is associated with the tracking identifier, and to transmit to the communications device a data payload that includes the counter value.

In accordance with a second aspect of this disclosure, there is provided a method of integrating data sets with a data repository. The method involves a computer server receiving a first data set that includes a terminal identifier and a message type code. The computer server locates an object profile that is associated with the terminal identifier in a data repository. The located object profile includes a tracking identifier and a counter value. The computer server updates the counter value in the object profile in accordance with a value of the message type code.

The method further involves the computer server receiving from a communications device a second data set that includes the tracking identifier. The computer server locates the counter value in the object profile that is associated with the tracking identifier, and transmits to the communications device a data payload that includes the counter value.

In accordance with a third aspect of this disclosure, there is provided a computer-readable medium that stores computer processing instructions which, when executed by at least one processor of a computer server, cause the computer server to receive a first data set that includes a terminal identifier and a message type code. The processing instructions cause the computer to locate an object profile that is associated with the terminal identifier in a data repository. The object profile includes a tracking identifier and a counter value. The processing instructions also cause the computer to update the counter value in the object profile in accordance with a value of the message type code.

The processing instructions also cause the computer server to receive a second data set from a communications device. The second data set includes the tracking identifier. The processing instructions cause the computer server to locate the counter value in the object profile that is associated with the tracking identifier, and to transmit to the communications device a data payload that includes the counter value.

Since the data integration system modifies pre-existing object profiles based on the data elements in the received data sets, the data integration system is able to merge different data sets into a novel compact data form.

BRIEF DESCRIPTION OF THE DRAWINGS

An exemplary data integration system and method of integrating data sets into an object profile will now be described, with reference to the accompanying drawings, in which.

DETAILED DESCRIPTION

Data Integration Network

Figure 1:
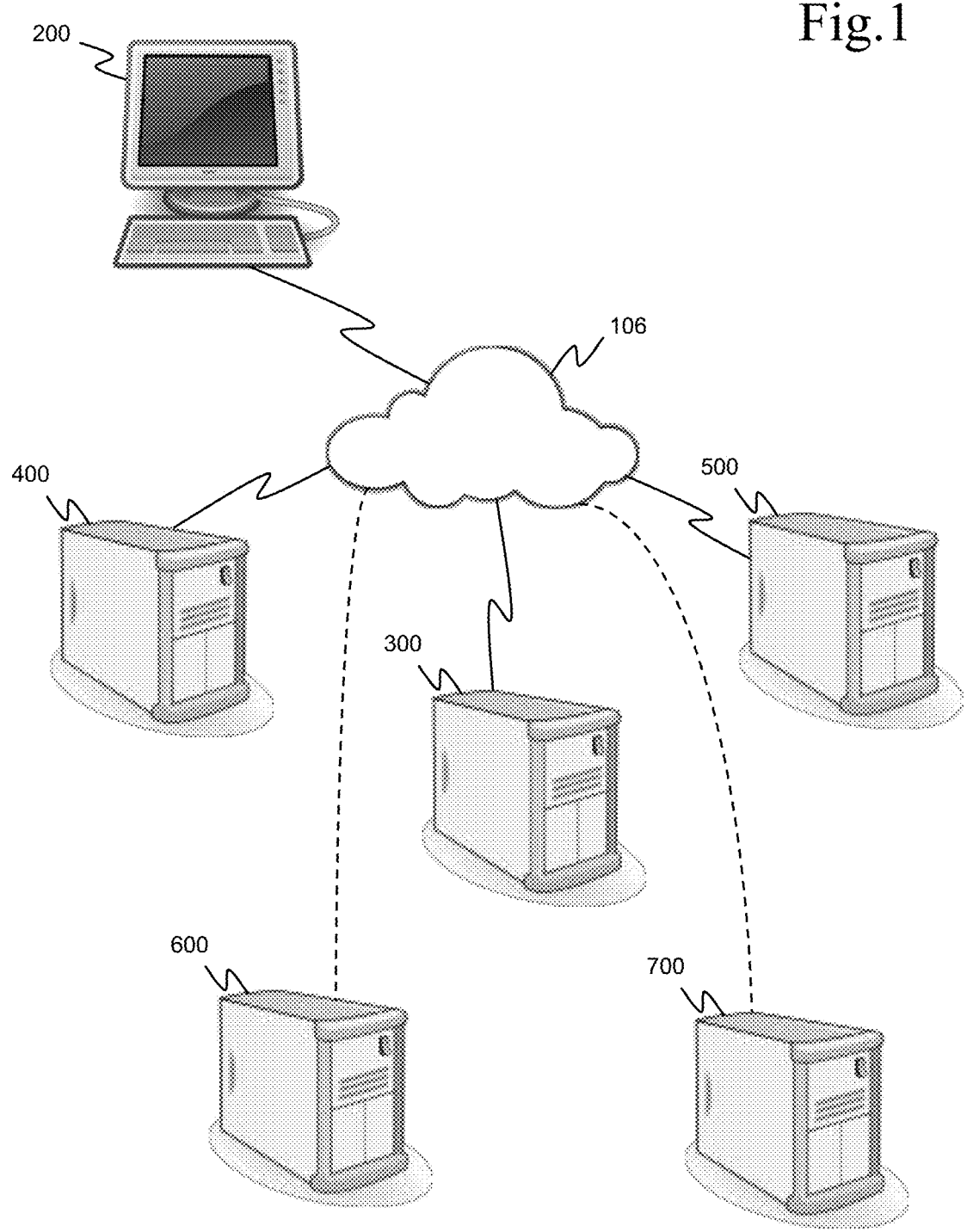
FIG. 1 is a schematic view of a data integration network that includes a personal communications device and a data integration system.

FIG. 1 is a schematic view of a data integration network, denoted generally as 100. As shown, the data integration network 100 includes a personal communications device 200, a data integration system 300, a merchant server 400, and an issuer server 500.

The personal communications device 200 may be configured to communicate with the data integration system 300, the merchant server 400, and the issuer server 500 via a communications network 106. As non-limiting examples, one or more of the personal communications devices 200 may be implemented as a personal computer, a tablet computer, or a smartphone. Accordingly, the communications network 106 may comprise one or more wired network, one or more wireless networks, or a combination of wired and wireless networks.

The data integration system 300 may be implemented as a computer server, and is configured to communicate with the personal communications device 200, the merchant server 400 and the issuer server 500 via the communications network 106.

The merchant server 400 may be implemented as a web-based computer server, and is configured to communicate with the personal communications device 200, the data integration system 300 and the issuer server 500 via the communications network 106. Each merchant server 400 may advertise various goods and/or services, and make be configured to accept payment, via the issuer server 500, for the advertised goods/services.

The issuer server 500 may be associated with and administered by a card issuer (e.g. a financial institution, independent card issuer) that issues payment cards (e.g. credit card or debit card) to users of the data integration network (or authorizes a third party to issue the payment cards). The issuer server 500 is configured to communicate with the personal communications device 200 and the merchant server 400 via the communications network 106, and may maintain a secure accounts database that includes a plurality of database records each associated with a respective network user payment account. Each database record of the accounts database may identify, for example, a primary account number that is uniquely associated with a network user's payment card, and a credit/deposit entry to the network user's payment account.

Although the data integration network 100 is shown comprising only a single personal communications device 200, a single data integration system 300, a single merchant server 400, and a single issuer server 500, the data integration network 100 may include one or more personal communications devices 200, data integration systems 300, merchant servers 400, and issuer servers 500.

Personal Communications Device

Figure 2:
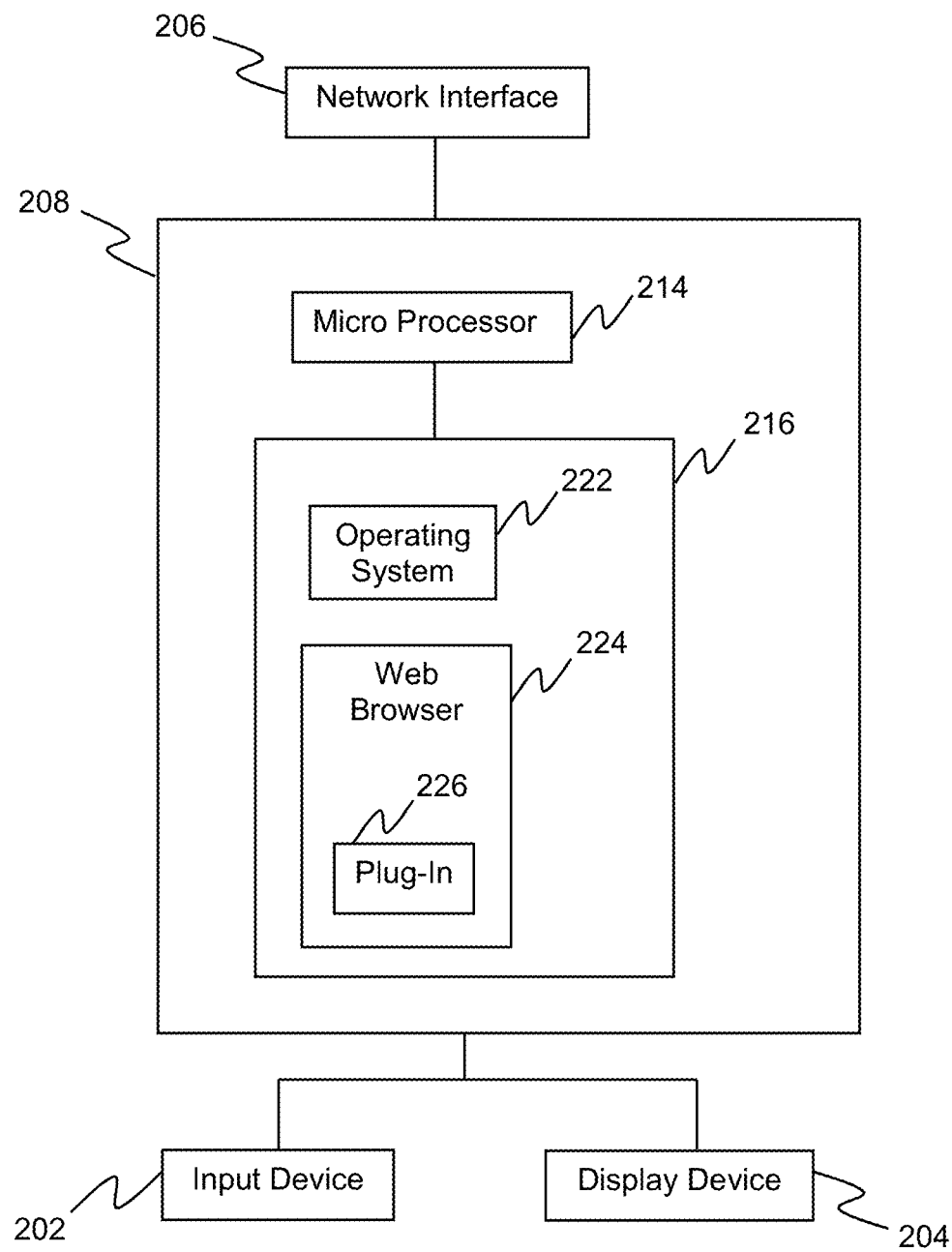
FIG. 2 is a schematic view of a sample personal communications device.

One or more users of the data integration network 100 may be provided with a respective personal communications device 200. In the example shown in FIG. 2, the personal communications device 200 includes an input device 202, a display device 204, a network interface 206, and a data processing system 208 that is coupled to the input device 202, the display device 204 and the network interface 206.

The input device 202 may be implemented as a keyboard, touchpad, touchscreen or other input device suitable for allowing a user of the personal communications device 200 to input data and/or commands into the personal communications device 200. The display device 204 may be implemented as a liquid crystal display (LCD) panel, or other display device suitable for displaying transaction information to the user. The network interface 206 interfaces the personal communications device 200 with the communications network 106.

The data processing system 208 may include one or more microprocessors 214, and a computer-readable media 216. As a non-limiting examples, the computer-readable media 216 may be provided as non-volatile electronic computer (e.g. FLASH) memory.

The computer-readable media 216 may store computer processing instructions which, when accessed and executed by the microprocessor(s) 214, implement an operating system 222. The operating system 222 allows the personal communications device 200 to accept user input from the input device 202, to control the display device 204, and to send and receive communications via the network interface 206.

The computer processing instructions may also implement one or more communications applications. One of the communications applications may allow the personal communications device 200 to communicate with the merchant server(s) 400 and the issuer server 500 via the communications network 106. In one implementation, this communications application is configured as a web browser 224 that provides the personal communications device 200 with web browser functionality.

Another of the communications applications may allow the personal communications device 200 to communicate with the data integration system 300 via the communications network 106. In one implementation, this other communications application is configured as a browser plug-in 226 that is installed in the web browser 224.

The functionality implemented by the browser plug-ins 226 will be discussed in greater detail below. However, at this point it is sufficient to note that the web browser 224 may be used to download the browser plug-in 226 to the associated personal communications device 200 from, for example, the data integration system 300. The data integration system 300 may configure the browser plug-in 226 with a terminal identifier termID that allows the data integration system 300 to identify the personal communications device 200.

Data Integration System

Figure 3:
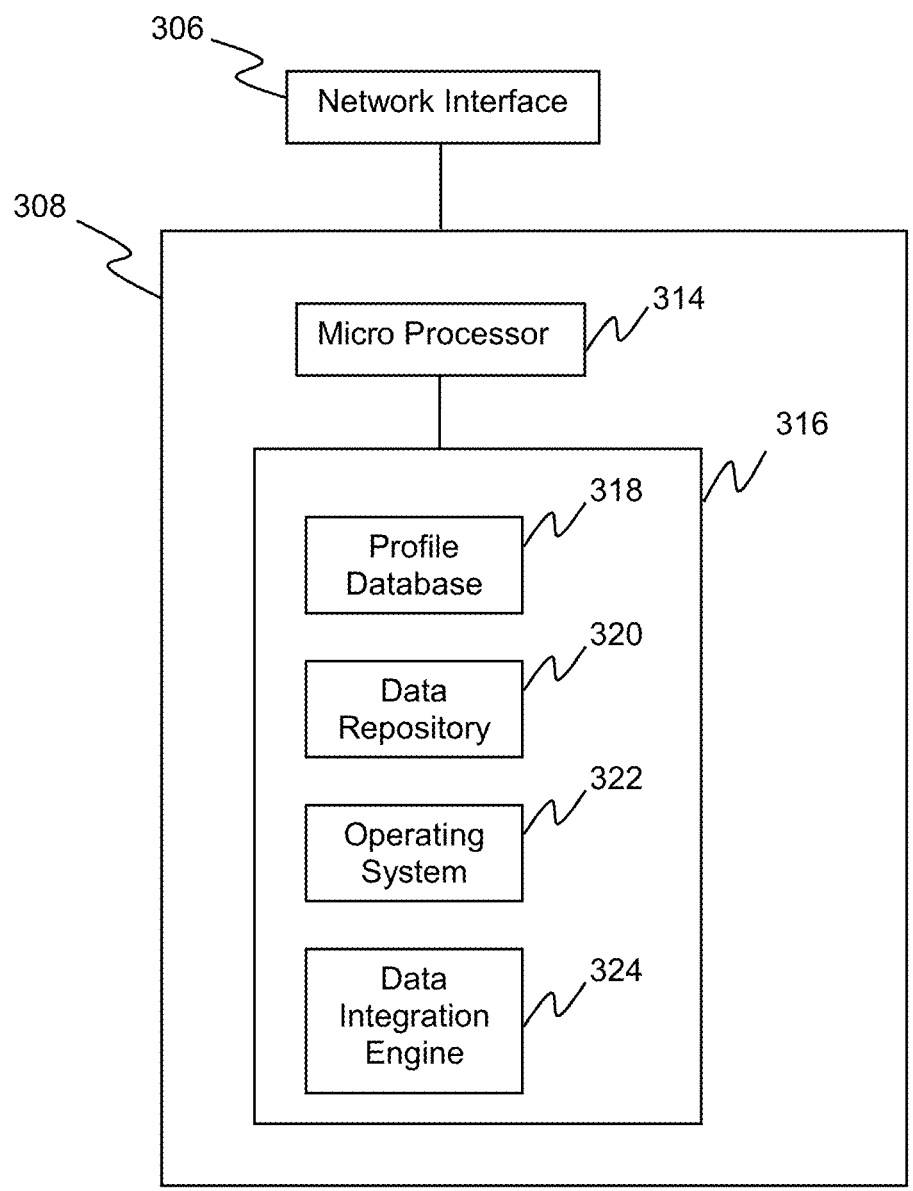
FIG. 3 is a schematic view of a sample data integration system.

In the example shown in FIG. 3, the data integration system 300 includes a network interface 306 and a data processing system 308 that is coupled to the network interface 306. The network interface 306 interfaces the data integration system 300 with the communications network 106, and allows the data integration system 300 to communicate with the personal communications device 200, the merchant server 400 and the issuer server 500.

The data processing system 308 may include one or more microprocessors 314, and one or more non-transient computer-readable media 316. As a non-limiting examples, the computer-readable media 316 may be provided as non-volatile electronic computer (e.g. FLASH) memories.

One or more of the computer-readable media 316 may store a database ("profile database") 318. Alternately, as shown in FIG. 1, the profile database 318 may be deployed on a profile database server 600 that is distinct from the data integration system 300 and is configured to communicate with the data integration system 300 via the communications network 106.

The profile database 318 includes at least one terminal profile. As noted above, the users of the data integration network 100 may each be provided with a respective personal communications device 200. Therefore, the terminal profiles are each associated with a personal communications device 200, and include a terminal identifier termID which the data integration system 300 uses to identify the personal communications device 200.

One or more of the computer-readable media 316 may store a database ("data repository") 320. Alternately, as shown in FIG. 1, the data repository 320 may be deployed on a data repository server 700 that is distinct from the data integration system 300 and is configured to communicate with the data integration system 300 via the communications network 106. In another variation (not shown), the profile database 318 and the data repository 320 are deployed on a common database server that is distinct from the data integration system 300.

The data repository 320 includes at least one object profile. The object profiles may each include a counter, and one of the tracking identifiers that are stored in the profile database 318.

The computer-readable media 316 may also store computer processing instructions which, when accessed and executed by the microprocessor(s) 314, implement an operating system 322 and a data integration engine 324. Alternately, all or a portion of the functionality of the data integration engine 324 may be implemented instead in electronics hardware, such as a field programmable logic gate array (FPGA) or a complex programmable logic device (CPLD).

The operating system 322 allows the data integration system 300 to communicate with the personal communications device 200, the merchant server 400 and the issuer server 500 via the communications network 106.

The data integration engine 324 is configured to receive, via the communications network 106, a (first) data set that includes a user identifier userID and a message type code.

The data integration engine 324 is configured to select a terminal profile from the profile database 318. The selected terminal profile is associated with the user identifier userID and includes a tracking identifier. The data integration engine 324 is also configured to locate the tracking identifier in the selected terminal profile.

The data integration engine 324 is configured to select an object profile from the data repository 320. The selected object profile is associated with the located tracking identifier and includes the located tracking identifier and an associated counter. The data integration engine 324 is also configured to update the counter in the selected object profile in accordance with a value of the message type code.

The data integration engine 324 may be configured to select the terminal profile by recovering the terminal identifier termID from the user identifier userID, and querying the profile database 318 with the recovered terminal identifier termID (and thereby locate a terminal profile that has a terminal identifier termID matching the recovered terminal identifier termID).

Prior to receiving the (first) data set (user identifier userID, message type code), the data integration system 300 may receive a (second) data set that includes a terminal identifier termID and at least one tracking identifier. The data integration engine 324 may be configured to, after receiving the (second) data set, (i) locate the terminal profile in the profile database 318 that includes the received terminal identifier termID, and (ii) save the tracking identifier(s) in the located terminal profile in association with the terminal identifier termID.

The second data set may also include a merchant identifier. In this variation, the data integration engine 324 is configured to, after receiving the second data set, (i) locate a merchant server 400 that is associated with the merchant identifier, (ii) locate on the merchant server 400 an authorization value that is associated with the tracking identifier (also included in the second data set), and (iii) store the authorization value in association with the tracking identifier in the terminal profile (that stores the terminal identifier termID of the second data set).

The first data set may also include a merchant code and an authorization amount. In this variation, the data integration engine 324 is configured to, after receiving the first data set, (i) locate a merchant server 400 that is associated with the merchant code, (ii) locate on the merchant server 400 an authorization value that is associated with the tracking identifier (of the second data set), and (iii) confirm that the authorization value matches the authorization amount.

Method of Integrating Data Sets

As discussed, the data integration network 100 implements a method of integrating data sets into an object profile.

As will be described in greater detail below, in one embodiment the data integration system 300 receives a (first) data set that includes a user identifier userID and a message type code. The data integration system 300 then selects one of the terminal profiles from the profile database 318. The selected terminal profile is associated with the user identifier userID and includes a tracking identifier.

The data integration system 300 locates the tracking identifier in the selected terminal profile, and selects one of the object profiles from the data repository 320. The selected object profile is associated with the located tracking identifier, and includes the located tracking identifier and an associated counter.

The data integration system 300 then updates the counter in the selected object profile in accordance with a value of the message type code.

The data integration system 300 may select the terminal profile by recovering the terminal identifier termID from the user identifier userID, and querying the profile database 318 with the recovered terminal identifier termID (and thereby locate a terminal profile that has a terminal identifier termID matching the recovered terminal identifier termID).

Prior to receiving the (first) data set (user identifier userID, message type code), the data integration system 300 may receive a (second) data set that includes a terminal identifier termID and at least one tracking identifier. After receiving the (second) data set, the data integration system may locate, in the profile database 318, the terminal profile that includes the received terminal identifier termID, and save the tracking identifier(s) in the located terminal profile in association with the terminal identifier termID.

The second data set may also include a merchant identifier. In this variation, the data integration system 300 may, after receiving the second data set, (i) locate a merchant server 400 that is associated with the merchant identifier, (ii) locate on the merchant server 400 an authorization value that is associated with the tracking identifier (also included in the second data set), and (iii) store the authorization value in association with the tracking identifier in the terminal profile (that stores the terminal identifier termID of the second data set).

The first data set may also include a merchant code and an authorization amount. In this variation, the data integration system 300 may, after receiving the first data set, (i) locate a merchant server 400 that is associated with the merchant code, (ii) locate on the merchant server 400 an authorization value that is associated with the tracking identifier (of the second data set), and (iii) confirm that the authorization value matches the authorization amount.

Figure 4A:
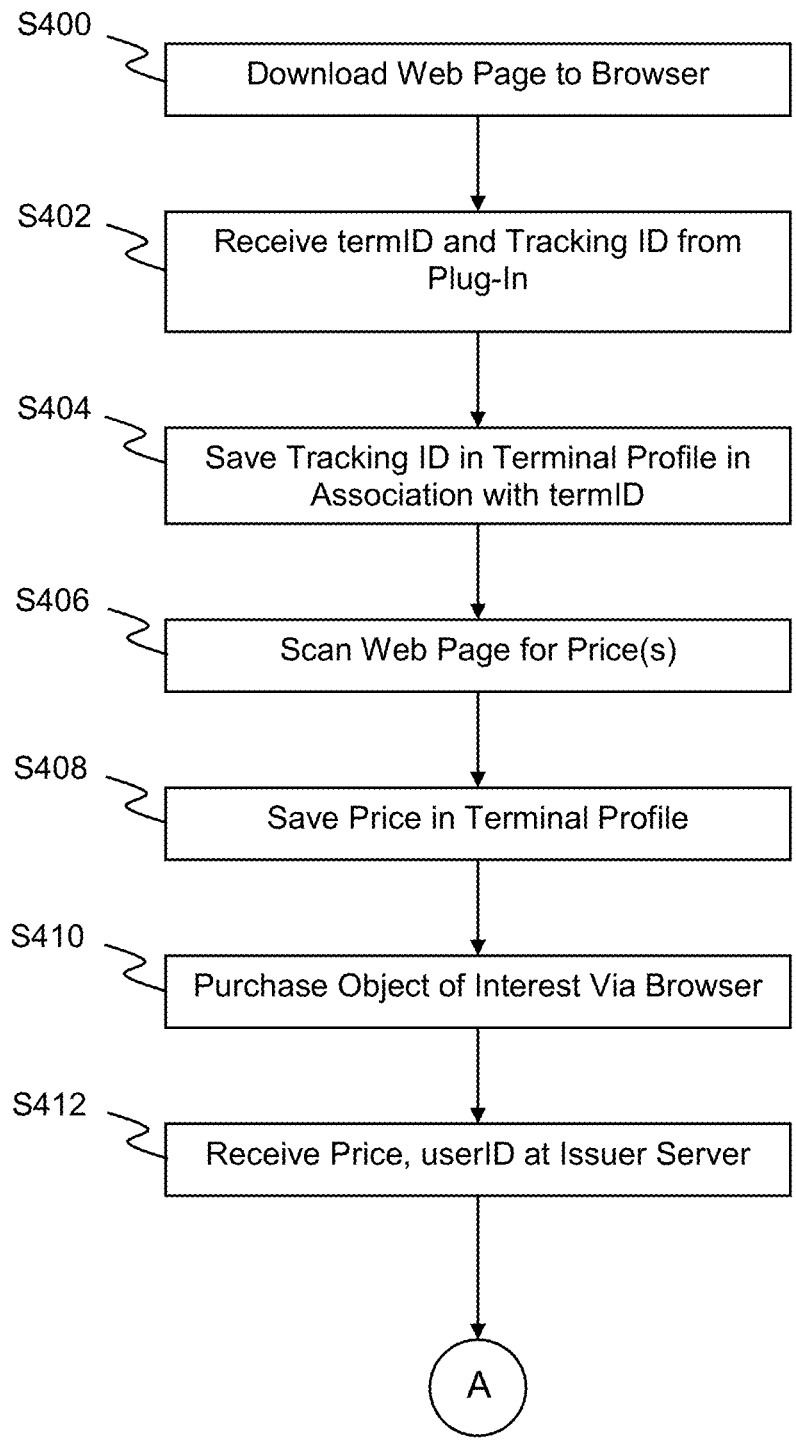
FIGS. 4*a*, 4*b* together are a flow chart depicting a sample method of integrating data sets into an object profile.
Figure 4B:
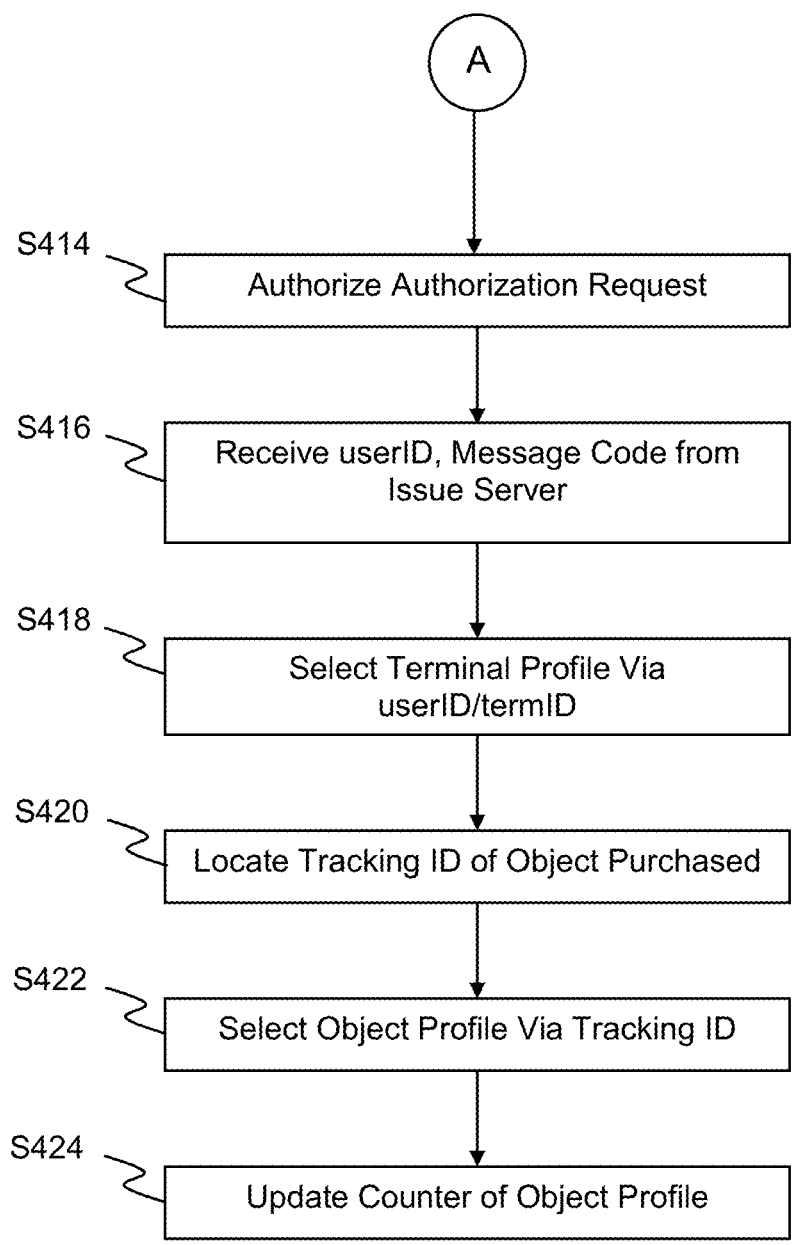

The method of integrating data sets into an object profile will now be discussed in detail with reference to the embodiment depicted in FIGS. 4*a*, 4*b*.

In this embodiment, the data integration system 300 includes (or is in communication with) a profile database 318 and a data repository 320. The profile database 318 is configured to store terminal profiles, and the data repository 320 is configured to store object profiles. The data elements that are stored in the terminal profiles and the object profiles will be discussed below.

At the outset of the method, the data integration system 300 may configure a browser plug-in 226 with a terminal identifier termID, install the browser plug-in 226 in one of the personal communications devices 200, and updates the profile database 318 with a terminal profile that includes the terminal identifier termID.

A data integration network user may initiate the foregoing steps by using the web browser 224 of the user's personal communications device 200 to establish an encrypted connection with the data integration system 300, and then using the web browser 224 to request a browser plug-in 226 from the data integration system 300.

In response, the data integration system 300 may prompt the data integration network user to input a user identifier userID into the web browser 224. The user identifier userID may be any data string that is associated with the data integration network user.

The user identifier userID may be uniquely associated with the data integration network user, in the sense that no other data integration network user has the same user identifier userID. Therefore, the user identifier userID may be, for example, the account number of the data integration network user's personal payment card. Alternately, the user identifier userID may be uniquely associated with a group of related data integration network users, in the sense that all data integration network users of the group have the same user identifier userID but no other group of data integration network users has the same user identifier userID. Therefore, the user identifier userID may be the account number of a payment card that is used by the respective group (e.g. corporate payment card).

As discussed, the profile database 318 is configured to store terminal profiles. Therefore, after receiving the user identifier userID, the data integration system 300 may generate a terminal identifier termID from the user identifier userID, generate a new terminal profile that includes the terminal identifier termID, and save the new terminal profile in the profile database 318. As will become apparent, the data integration system 300 uses the terminal identifier termID to subsequently identify the personal communications device 200.

The data integration system 300 may generate the terminal identifier termID from the user identifier userID using any suitable technique that can uniquely one associate one datum with another datum. For example, the data integration system 300 may generate the terminal identifier termID by applying the user identifier userID as an input to a hash algorithm. The data integration system 300 may generate the terminal identifier termID by applying the user identifier userID and a master cryptographic key as inputs to a cryptographic algorithm (e.g. termID=userID XOR master cryptographic key). Alternately, the data integration system 300 may maintain a cross-reference table (not shown) that associates terminal identifiers termID with user identifiers userID. The cross-reference table may be pre-populated with unique terminal identifiers termID, and the data integration engine 324 may associate user identifier userID with one of the terminal identifiers termID.

After saving the terminal profile in the profile database 318, the data integration system 300 configures the browser plug-in 226 with the terminal identifier termID, and downloads and installs the browser plug-in 226 to the web browser 224 via the encrypted connection that was previously established between the web browser 224 and the data integration system 300.

Thereafter, the data integration network users may use their respective personal communications device 200 to access one or more of the merchant servers 400. Accordingly, as show in FIGS. 4a, 4b, at step S400 the web browser 224 of one of the personal communications devices 200 establishes a connection with one of the merchant servers 400, and the web browser 224 downloads a merchant web page from the merchant server 400 to the personal communications device 200.

The merchant associated with the merchant server 400 may advertise various "object of interest" on the merchant web page. An "object of interest" may be a good/service that may be available for purchase, lease or rent from the merchant. The merchant web page may describe and/or depict one or more objects of interest, and may also identify an authorization value for each object of interest. The authorization value of an object interest may be the estimated purchase price of the object, inclusive of tax (if any) and/or shipping costs (if any).

The merchant web page may also include one or more tracking identifiers, each associated with a respective object of interest that is described/depicted on the web page. Each tracking identifier may be uniquely associated with a particular object of interest on a global or geographical basis. Accordingly, in one implementation, one or more of the tracking identifiers may be universal product codes (UPC). Alternately, each tracking identifier may be uniquely associated with a particular object of interest on a more local basis (e.g. unique amongst all objects of interest available from the respective merchant). Therefore, in another implementation, one or more of the tracking identifiers may be stock keeping units (SKU) or product model numbers.

At step S402, the browser plug-in 226 may establish an encrypted connection with the data integration system 300, extracts various features from the merchant web page, and transmits a data set to the data integration system 300 via the connection. Typically, the browser plug-in 226 extracts from the web page the tracking identifier of each object of interest that is described/depicted on the web page. Therefore, the data set typically includes the tracking identifier(s) and the terminal identifier termID of the browser plug-in 228.

The data set that the browser plug-in 226 transmits to the data integration system 300 may also include a merchant identifier that is associated with the merchant. The merchant identifier may be, for example, the domain name or IP address of the respective merchant server 400. The merchant identifier may be, for example, the uniform resource locator (URL) of the web page.

After receiving the data set from the browser plug-in 228, at step S404 the data integration system 300 locates, in the profile database 318, the terminal profile that includes the received terminal identifier termID, and saves the tracking identifier(s) (and the merchant identifier, if included) in the profile database 318 in the located terminal profile, in association with the terminal identifier termID.

As may be apparent, in this embodiment the browser plug-in 226 transmits the data sets to the data integration system 300 as the web browser 224 downloads merchant web pages from the merchant server 400. However, as these data sets are transmitted to the data integration system 300 before the data integration network user purchases any of the objects of interest, the authorization values for the objects of interest might be excluded from these data sets.

Therefore, at step S406 the data integration system 300 may use the merchant identifier (if received at step 304) to identify the merchant server 400 from which the tracking identifier(s) were extracted, and establish a connection with the merchant server 400. The data integration system 300 may also use the merchant identifier to access the merchant web page previously accessed by the data integration network user.

For each tracking identifier (received at step S404), the data integration system 300 may scan the merchant server 400 (and/or the merchant web page) for the authorization value of the object of interest that has a tracking identifier matching the received tracking identifier. After determining the authorization value for the object(s) of interest, at step S408 the data integration system 300 may save each authorization value in the profile database 318 in the located terminal profile, in association with the terminal identifier term ID and the respective tracking identifier.

The data integration system 300 may repeat steps S400 to S408 as data integration network users use their respective personal communications device 200 to access the merchant servers 400 and view the merchants' objects of interest.

Thereafter, one of the data integration network users may use their personal communications device 200 to purchase one of the merchants' objects of interest. Accordingly, at step S410 the web browser 224 of one of the personal communications devices 200 may establish an encrypted connection with the merchant server 400, and download a checkout web page from the merchant server 400 to the personal communications device 200. The checkout web page may include the merchant identifier, and may identify the authorization value of the object of interest that the data integration network user intends to purchase.

The checkout web page may request that the data integration network user confirm that the network user intends to purchase the identified object of interest. After the data integration network user confirms the purchase, the checkout web page may redirect the web browser 224 to an online payment services gateway (not shown) and provide the payment services gateway with the merchant identifier and the authorization value of the object of interest that the data integration network user intends to purchase.

The payment services gateway may establish an encrypted connection with the web browser 224, and download to the web browser 224 a payment confirmation web page that prompts the data integration network user to input the network user's user identifier userID into the web browser 224. As noted above, the user identifier userID may be, for example, the primary account number of the data integration network user's personal or corporate payment card.

After receiving the user identifier userID, the payment services gateway may generate an authorization request that includes the user identifier userID and the authorization value of the object of interest, and may transmit the authorization request to an issuer server 500 that maintains the payment account that is associated with the user identifier userID. The payment services gateway may transmit the authorization request to the issuer server 500 via a secure payment subnetwork of the communications network 106, such as Visa's VisaNet or Mastercard's BankNet.

After receiving the authorization request at step S412, the issuer server 500 may confirm that the payment account associated with the user identifier userID in the secure accounts database has a sufficient balance to complete the purchase for the authorization value. After confirming that the data integration network user's payment account has a sufficient balance to complete the purchase, at step S414 the issuer server 500 may post the authorization value to the data integration network user's payment account, and generate an authorization code confirming that the payment in the amount of the authorization value was authorized.

The issuer server 500 may return the authorization code to the payment services gateway via the secure payment subnetwork, and the payment services gateway may provide the web browser 224 with the authorization code. The payment confirmation web page may then redirect the web browser 224 back to the merchant server 400, and provide the merchant server 400 with the authorization code. The merchant may then proceed with clearance and settlement of the payment in a manner known to those skilled in the art.

At step S416, the issuer server 500 may establish an encrypted connection with the data integration system 300, and transmit a data set to the data integration system 300 via the connection. The data set includes the user identifier userID, the authorization value of the purchased object of interest, and a message type code that confirms that the data integration network user associated with the user identifier userID completed the purchase of the object of interest. The data set may also include the merchant identifier.

Therefore, although the "first" data set (user identifier userID, message type code, etc., received at step S416) and the "second" data set (terminal identifier termID, tracking identifier, etc., received at step S402) may originate from the same personal communications device 200, the data integration system 300 receives the first data set over a communications channel that is different from the communications channel over which the data integration system 300 receives the second data set.

Alternately, instead of purchasing one of the merchants' objects of interest, one of the data integration network users may initiate a return (and associated refund) of one of the merchants' objects of interest. Accordingly, at step S410 the web browser 224 may download from a merchant server 400 a refund web page that identifies the authorization value of the object of interest that the data integration network user is returning. The refund web page may prompt the data integration network user to input the network user's user identifier userID, and the payment services gateway may transmit a refund request (user identifier userID, authorization value) to the issuer server 500 at step S412.

At step S414, the issuer server 500 may post the refund to the network user's payment account, and return the authorization code to the payment services gateway. The payment services gateway may return the authorization code to the merchant server 400 via redirection of the web browser 400, as described above. At step S416, the issuer server 500 may transmit to the data integration system 300 a data set includes the user identifier userID, the authorization value of the object of interest, and a message type code that confirms that the object of interest has been returned (and that the authorization value has been refunded).

Regardless of whether the data integration network user initiated a purchase or return of one of the merchant's objects of interest at step S410, at step S418 the data integration system 300 selects one of the terminal profiles from the profile database 318. If the data integration system 300 previously saved any tracking identifiers in the terminal profile at step S404, the selected terminal profile will include one or more tracking identifiers.

As discussed above, when the web browser 224 requested a browser plug-in 226 from the data integration system 300, the data integration system 300 will have created a terminal identifier termID from the user identifier userID that was provided by the data integration network user, generated a new terminal profile that included the terminal identifier termID, and saved the new terminal profile in the profile database 318. Therefore, the data integration system 300 selects a terminal profile, at step S418, by (i) recovering the terminal identifier termID from the user identifier userID (of the "first" data set, received at step S416), and (ii) querying the profile database 318 with the recovered terminal identifier termID for a terminal profile that has a terminal identifier termID matching the recovered terminal identifier termID. Accordingly, the selected terminal profile (selected at step S418) will be associated with the user identifier userID that was included in the "first" data set.

As discussed, the "first" data set may also include a merchant identifier. Further, at step S404, the data integration system 300 may have saved a merchant identifier in the terminal profile (in association with the tracking identifier(s) and the terminal identifier termID). Therefore, the data integration system 300 may select a terminal profile, at step S418, by (i) recovering the terminal identifier termID from the user identifier userID, and (ii) querying the profile database 318 with the recovered terminal identifier termID and with the merchant code that was included in the first data set.

The data integration system 300 may recover the terminal identifier termID from the user identifier userID, at step S418, using any suitable recovery algorithm. For example, as discussed above, the data integration system 300 will have associated the terminal identifier termID with a user identifier userID when the web browser 224 requested a browser plug-in 226 from the data integration system 300. The data integration system 300 may recover the terminal identifier termID using a technique corresponding to the technique that was used to associate the terminal identifier termID with the user identifier userID.

For example, if the data integration system 300 generated the terminal identifier termID by applying the user identifier userID as an input to a hash algorithm, the data integration system 300 may recover the terminal identifier termID by applying the user identifier userID as an input to the same hash algorithm. If the data integration system 300 generated the terminal identifier termID by applying the user identifier userID and a master cryptographic key as inputs to a cryptographic algorithm, the data integration system 300 may recover the terminal identifier termID by applying the user identifier userID and the master cryptographic key as inputs to the same cryptographic algorithm. If the data integration system 300 associated the user identifier userID with a pre-determined terminal identifier termID in a cross-reference table, the data integration system 300 may recover the terminal identifier termID by querying the cross-reference with the user identifier userID.

As discussed, in this embodiment the browser plug-in 226 will have transmitted the data sets to the data integration system 300 before the data integration network user purchased any of the objects of interest. Therefore, one or more of the tracking identifier(s) stored in the selected terminal profile might be associated with objects of interest that the data integration network user reviewed, or considered purchasing, but did not actually purchase. Accordingly, after selecting the terminal profile that has a terminal identifier termID corresponding to the user identifier userID (included in the first data set), at step S420 the data integration system 300 locates in the selected terminal profile the tracking identifier of the object of interest that the data integration network user purchased.

As noted above, for each tracking identifier (received at step S404), at step S408 the data integration system 300 may have scanned the merchant server 400 for the authorization value of the associated object of interest, and saved each authorization value in the terminal profile having the associated terminal identifier termID. Therefore, the data integration system 300 may locate the tracking identifier of the object of interest purchased, at step S420, by (i) comparing the authorization value(s) that are saved in the selected terminal profile against the authorization value that was included in the first data set (received at step S416), and (ii) identifying the one tracking identifier that is associated with the authorization value that matches the authorization value that was included in the first data set.

As discussed, the data repository 320 is configured to store object profiles. Therefore, after confirming that the authorization value associated with the one tracking identifier corresponds to the authorization value that was included in the first data set (i.e. after locating the tracking identifier of the object of interest purchased), at step S422 the data integration system 300 may select from the data repository 320 an object profile that includes the located tracking identifier.

The data integration system 300 may select the object profile, at step S422, by querying the data repository 320 with the located tracking identifier for an object profile that includes the located tracking identifier. If the query does not locate any object profile that includes the located tracking identifier, the data integration system 300 generates a new object profile that includes the located tracking identifier and an associated counter, and saves the new object profile in the data repository 320. The object profile selected by the data integration system 300 at step S420 (whether newly generated at step S420, or generated previously) will, therefore, include the located tracking identifier.

The data integration system 300 uses the counter to track events that may have been performed by data integration network users in relation to the object of interest (identified by the located tracking identifier). As discussed, the message type code (included in the first data set) may confirm that the data integration network user associated with the user identifier userID completed the purchase of the associated object of interest. Therefore, the counter saved in the object profile may include, for example, a primary count field that maintains a primary count value that tracks the number of times that the associated object of interest has been purchased by a data integration network user.

Alternately, the message type code may advise that the data integration network user associated with the user identifier userID has returned the associated object of interest to the merchant. Therefore, the counter saved in the object profile may also include a secondary count field that maintains a secondary count value that tracks the number of times that the associated object of interest has been returned by a data integration network user.

After selecting the object profile that includes the located tracking identifier, at step S424 the data integration system 300 updates the counter in the selected object profile, in accordance with the value of the message type code (included in the first data set). For example, if the message type code indicates that a data integration network user purchased the associated object of interest, at step S424 the data integration system 300 may increment the primary count value of the counter. Conversely, if the message type code indicates that a data integration network user returned the associated object of interest, at step S424 the data integration system 300 may increment the secondary count value.

As discussed, in the foregoing embodiment the browser plug-in 226 of the personal communications device 200 transmits the "second" data sets to the data integration system 300 (at step S402) before the data integration system 300 receives notification (at step S416) that a data integration network user has purchased (or requested a refund of) an object of interest. Therefore, in the foregoing embodiment, at step S408 the data integration system 300 may have scanned the merchant server 400 for the authorization value of each object of interest, and saved each authorization value in the profile database 318 in the respective located terminal profiles.

In one variation, the browser plug-in 226 does not transmit the second data sets to the data integration system 300 at step S402. Instead, in this variation, the browser plug-in 226 may transmit the second data set to the data integration system 300 at step S416, after the issuer server 500 provides the web browser 224 with an authorization code confirming that the payment in the amount of the authorization value was authorized.

Further, in this variation, since the data integration system 300 receives the authorization value from the browser plug-in 226, the data integration system 300 need not scan the merchant server 400 (and/or the merchant web page), at step S406, for the authorization value of the object of interest that has a tracking identifier matching the tracking identifier that was included in the second data set. Instead, the data integration system 300 may scan the merchant server 400 (and/or the merchant web page), at step S420, for the authorization values and associated tracking identifiers of the various objects of interest that are described/depicted on the merchant server 400.

At step S420, the data integration system 300 may also locate, in the selected terminal profile, the tracking identifier of the object of interest purchased by (i) comparing the authorization value of each described/depicted object of interest against the authorization value that was included in the first data set (received at step S416), and (ii) identifying the one tracking identifier that is associated with the authorization value that matches the authorization value that was included in the first data set.

The data integration system 300 may then select from the data repository 320 the object profile that includes the located tracking identifier, and update the counter in the selected object profile, as described above with reference to steps S422 to S424.

In the foregoing embodiment (and variations thereof), the data integration network user purchases one object of interest and, therefore, the authorization value of the first data set (received at step S416) matches the authorization value of one of the objects of interest that are saved in the selected terminal profile. However, if the data integration network user purchases more than one object of interest, the authorization value of the first data set will not match the authorization value of any single object of interest saved in the selected terminal profile.

Accordingly, in one variation, the data integration system 300 may be configured with authorization credentials that provide the data integration system 300 with authorized access to the online shopping baskets that may have been saved on a particular merchant server 400. Each online shopping basket saved on the merchant server 400 may include the particulars (e.g. tracking identifiers, associated authorization values) of multiple objects of interest that were purchased online by a respective data integration network user.

In this variation, the data integration system 300 may locate the tracking identifiers of the multiple objects of interest purchased by (i) comparing the grand total of the authorization value(s) of the objects of interest saved in each online shopping basket against the authorization value that was included in the first data set (received at step S416), and (ii) identifying the tracking identifiers from the online shopping basket that has a grand total that matches the authorization value that was included in the first data set. The comparison step may also involve the data integration system 300 comparing the date/time associated with each online shopping basket against the date/time of receipt of the first data set.

By implementing the method of steps S400 to S424, the data integration system 300 generates new object profiles and modifies pre-existing object profiles, and thereby integrates different data sets into compact data forms. However, in another variation, instead of merely integrating data sets into an object profile as described above, the data integration system 300 also provides the data integration network users with the object profiles.

In this latter variation, after receiving the second data set (terminal identifier termID, tracking identifier(s), etc.) from the browser plug-in 228 (at step S402), the data integration system 300 may query the data repository 320 for an object profile that has a tracking identifier matching the tracking identifier of the second data set. The data integration system 300 may also query one or more online data sources with the tracking identifier, for additional subject matter (e.g. third party reviews) on the object of interest that is associated with the tracking identifier.

The data integration system 300 may then generate a data payload that includes the object profile, and optionally the additional subject matter (if located), and transmit the data payload to the personal communications device 200. The data integration system 300 may transmit the data payload to the browser plug-in 226, and the web browser 224 may display the payload to the user of the personal communications device 200.

The data integration system 300 may transmit the data payload to the personal communications device 200 at step S402, in response to receiving the second data set. Alternately, the data integration system 300 may transmit the data payload to the personal communications device 200 after step S402, for example while/after updating the located terminal profile with the authorization value (step S408).

Alternately (or additionally), the data integration system 300 may transmit the data payload to the personal communications device 200 after receiving the first data set at step S416. For example, after recovering the terminal identifier termID from the user identifier userID of the first data set (step S418), locating the tracking identifier of the object of interest purchased (step S420), and selecting the object profile that includes the located tracking identifier (step S422), the data integration system 300 may identify the communications channel that was opened by the browser plug-in 226 (at step S402) that is configured with the recovered terminal identifier termID. The data integration system 300 may then transmit the data payload to the personal communications device 200 via that communications channel.

The invention claimed is:

1. A data integration system comprising:
   at least one memory; and
   at least one processor in communication with the at least one memory, the at least one memory storing computer processing instructions which, when executed by the at least one processor, cause the at least one processor to:
   receive a first data set including a terminal identifier and a message type code;
   locate an object profile associated with the terminal identifier in a data repository, the object profile including a tracking identifier and a counter value;
   update the counter value in the object profile in accordance with a value of the message type code;
   receive a second data set from a communications device, the second data set including the tracking identifier;
   locate the counter value in the object profile associated with the tracking identifier; and
   transmit to the communications device a data payload including the counter value.

2. The data integration engine according to claim 1, wherein the processing instructions cause the at least one processor to locate the object profile by locating a terminal profile associated with the terminal identifier in a profile database, recovering the tracking identifier from the terminal profile, and querying the data repository with the tracking identifier.

3. The data integration engine according to claim 2, wherein the second data set further includes a merchant identifier, and the processing instructions cause the at least one processor to receive the second data set by locating a computer server associated with the merchant identifier, locating an authorization value associated with the recovered tracking identifier on the located computer server, and storing the authorization value in the terminal profile in association with the tracking identifier and the merchant identifier.

4. The data integration engine according to claim 3, wherein the first data set further includes an authorization amount, and the processing instructions cause the at least one processor to recover the tracking identifier by confirming that the authorization value of the terminal profile corresponds to the authorization amount.

5. The data integration engine according to claim 3, wherein the first data set further includes a merchant code, the merchant identifier of the terminal profile corresponds to the merchant code, and the processing instructions cause the at least one processor to locate the terminal profile by querying the profile database with the merchant code.

6. The data integration engine according to claim 5, wherein the first data set further includes an authorization amount, and the processing instructions cause the at least one processor to recover the tracking identifier by locating a computer server associated with the merchant code, locating an authorization value associated with the tracking identifier on the located computer server, and confirming that the authorization value corresponds to the authorization amount.

7. The data integration engine according to claim 1, wherein the counter value includes a primary count value and a second count value, the message type code comprises one of a first type code and a second type code, and the processing instructions cause the at least one processor to update the counter value by incrementing the primary count value in response to receiving the first type code, and incrementing the second count value in response to receiving the second type code.

8. A method of integrating a data set with a data repository, the method comprising a computer server:
   receiving a first data set including a terminal identifier and a message type code;
   locating an object profile associated with the terminal identifier in a data repository, the object profile including a tracking identifier and a counter value;
   updating the counter value in the object profile in accordance with a value of the message type code;
   receiving a second data set from a communications device, the second data set including the tracking identifier;
   locating the counter value in the object profile associated with the tracking identifier; and
   transmitting to the communications device a data payload including the counter value.

9. The method according to claim 8, wherein the locating an object profile comprises locating a terminal profile associated with the terminal identifier in a profile database, recovering the tracking identifier from the terminal profile, and querying the data repository with the tracking identifier.

10. The method according to claim 9, wherein the second data set further includes a merchant identifier, and the receiving a second data set comprises locating a computer server associated with the merchant identifier, locating an authorization value associated with the recovered tracking identifier on the located computer server, and storing the authorization value in the terminal profile in association with the tracking identifier and the merchant identifier.

11. The method according to claim 10, wherein the first data set further includes an authorization amount, and the recovering the tracking identifier comprises confirming that the authorization value of the terminal profile corresponds to the authorization amount.

12. The method according to claim 10, wherein the first data set further includes a merchant code, the merchant identifier of the terminal profile corresponds to the merchant code, and the locating a terminal profile comprises querying the profile database with the merchant code.

13. The method according to claim 12, wherein the first data set further includes an authorization amount, and the recovering the tracking identifier comprises locating a computer server associated with the merchant code, locating an authorization value associated with the tracking identifier on the located computer server, and confirming that the authorization value corresponds to the authorization amount.

14. The method according to claim 8, wherein the counter value includes a primary count value and a second count value, the message type code comprises one of a first type code and a second type code, and the updating the counter value comprises (i) incrementing the primary count value in response to receiving the first type code, and (ii) incrementing the second count value in response to receiving the second type code.

15. A non-transient computer-readable medium storing computer processing instructions which, when executed by at least one processor of a computer server, cause the computer server to:
   receive a first data set including a terminal identifier and a message type code;
   locate an object profile associated with the terminal identifier in a data repository, the object profile including a tracking identifier and a counter value;
   update the counter value in the object profile in accordance with a value of the message type code;
   receive a second data set from a communications device, the second data set including the tracking identifier;
   locate the counter value in the object profile associated with the tracking identifier; and
   transmit to the communications device a data payload including the counter value.

16. The computer-readable medium according to claim 15, wherein the processing instructions cause the at least one processor to locate the object profile by locating a terminal profile associated with the terminal identifier in a profile database, recovering the tracking identifier from the terminal profile, and querying the data repository with the tracking identifier.

17. The computer-readable medium according to claim 16, wherein the second data set further includes a merchant identifier, and the processing instructions cause the at least one processor to receive the second data set by locating a computer server associated with the merchant identifier, locating an authorization value associated with the recovered tracking identifier on the located computer server, and storing the authorization value in the terminal profile in association with the tracking identifier and the merchant identifier.

18. The computer-readable medium according to claim 17, wherein the first data set further includes an authorization amount, and the processing instructions cause the at least one processor to recover the tracking identifier by confirming that the authorization value of the terminal profile corresponds to the authorization amount.

19. The computer-readable medium according to claim 17, wherein the first data set further includes a merchant code, the merchant identifier of the terminal profile corresponds to the merchant code, and the processing instructions cause the at least one processor to locate the terminal profile by querying the profile database with the merchant code.

20. The computer-readable medium according to claim 19, wherein the first data set further includes an authorization amount, and the processing instructions cause the at least one processor to recover the tracking identifier by locating a computer server associated with the merchant code, locating an authorization value associated with the tracking identifier on the located computer server, and confirming that the authorization value corresponds to the authorization amount.

21. The computer-readable medium according to claim 15, wherein the counter value includes a primary count value and a second count value, the message type code comprises one of a first type code and a second type code, and the processing instructions cause the at least one processor to update the counter value by incrementing the primary count value in response to receiving the first type code, and incrementing the second count value in response to receiving the second type code.

* * * * *